Feb. 25, 1964

B. I. SHAPIRO ETAL 3,122,015

APPARATUS FOR MEASURING VIBRATION OF
HEAT EXCHANGER TUBES

Filed Oct. 28, 1960

INVENTORS
BERNARD I. SHAPIRO
RAYMOND F. MISIALEK
BY

ATTORNEY

United States Patent Office 3,122,015
Patented Feb. 25, 1964

3,122,015
APPARATUS FOR MEASURING VIBRATION OF HEAT EXCHANGER TUBES
Bernard I. Shapiro, Philadelphia, and Raymond F. Misialek, Drexel Hill, Pa., assignors to the United States of America as represented by the Secretary of the Navy
Filed Oct. 28, 1960, Ser. No. 65,868
3 Claims. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

This invention relates to vibration measuring and more particularly to measuring and recording the vibration of small diameter heat exchange tubes.

The possibility of failure of apparatus when it is subjected to an instantaneous or rapidly applied force in the nature of a shock or vibration is well known. Apparatus which is apt to be subject to vibration forces is frequently tested for its ability to stand up under operating conditions prior to being placed in actual use. Heretofore vibration testing has been accomplished by examining the exterior surface of a vibrating member under operating conditions, by the use of well known pick-up devices, but the known prior art has not been concerned with examining the interior surface of fluid conduits.

The broad object of this invention is directed to apparatus forming an electrical pick-up unit which is adapted for measuring the vibration of small diameter and closely spaced tubes of a heat exchange unit.

A further object is to provide a piezo-electrical accelerometer unit for insuring accurate vibration measurement during its movement through a tube of a heat exchange unit while the unit is under operating conditions.

Another object is to provide a piezo-electrical accelerometer unit for movement through a tube of a heat exchange unit and to constantly transmit tube vibrations to the accelerometer.

Other objects will be apparent from the following description, taken in connection with the accompanying drawings.

The adaptation of heat exchangers, such as condensers, for use with nuclear ship propulsion equipment permits the heat transfer tubes to be closely spaced and of small diameter, generally of one-half inch or somewhat smaller and the consequent use of small dimensional heat exchangers. Since the nuclear propulsion equipment is intended to be used over extended periods without necessitating repair or replacement of parts, it is essential when the equipment is initially installed that all of the elements or component parts meet the requirements for the anticipated extended use.

The problem of measuring tube vibration in the heat exchangers of such equipment under operating conditions has been known for several years but no satisfactory answer has been found to overcome the problem. The prior art of vibration measuring has been of practically no assistance in solving the problem for the general reason that vibration instruments or devices heretofore used have been fixedly mounted to the vibrating member. Additionally, the structure of the nuclear type heat exchange equipment is such that it is not practical to apply mechanical or electro-mechanical pick-up devices such as strain guages, for example, to the exterior of the tubes to determine vibration since the tubes are assembled in such closely spaced relation and also for the reason that the heat exchange medium surrounding the tube would interfere with vibration indicators mounted on the exterior of the tubes.

It has been determined that accelerometers of the piezo-electrical type which provide broad operational acceleration and frequency characteristics as well as high sensitivity and which are constructed in miniature form are suitable for overcoming the problem. Several such miniature accelerometers are commercially available and the present invention is directed to a modification of one such accelerometer which provides a rigid unitary structure and which insures a true indication or measurement of tube vibration.

For a better understanding of the invention, reference should be made to the accompanying drawings, in which.

Figure 1:
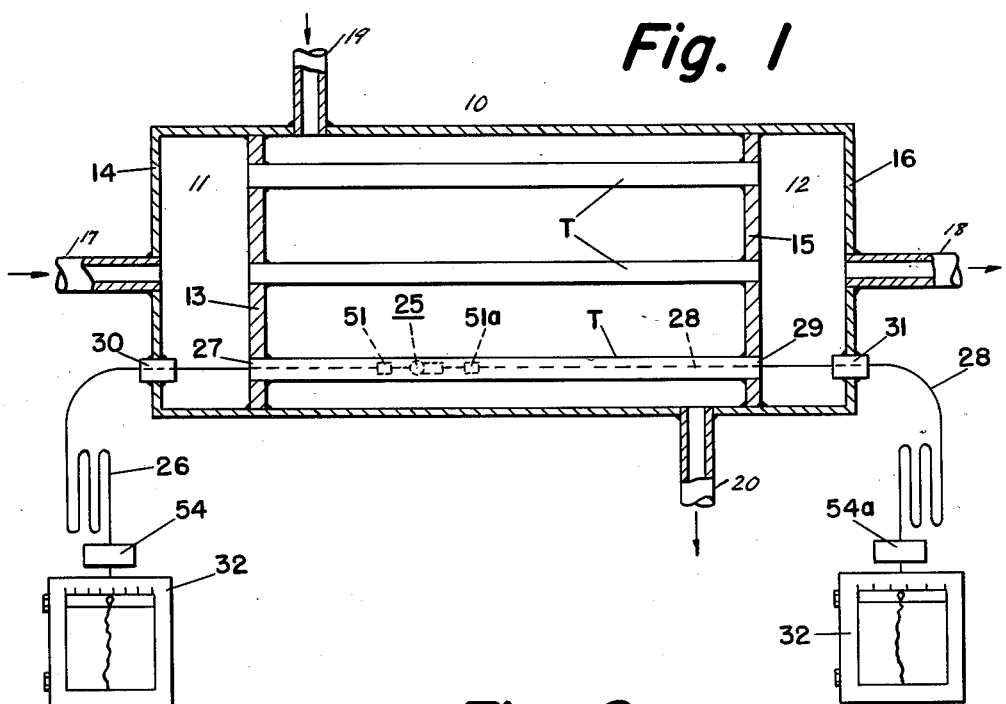
FIG. 1 is a view in longitudinal section of a heat exchange unit with the invention incorporated therewith and shown diagrammatically, the heat exchanger having only several tubes shown for the purpose of clarity.

Referring to FIG. 1, the heat exchanger indicated at 10 is provided with end manifolds 11 and 12. The manifold 11 is formed by an inner tube sheet 13 and an end wall 14 and manifold 12 is formed by tube sheet 15 and an end wall 16. The manifold 11 is supplied with fluid through inlet 17 which passes through the tubes T to the other manifold 12 and out of the heat exchange unit 10 by outlet 18. When the heat exchanger is used as a condenser, steam from other equipment in the system with which the condenser is used will be supplied to the unit 10 through an inlet 19 and be distributed into the space between the tubes T and after heat exchange with the water in the tubes, the condensate will be exited through outlet 20.

In the condensers used with nuclear reactor equipment, the tubes T will be of small diameter, for example, between 3/8" and 1/2" and the tube pattern may be such that the tubes radiate from the longitudinal axis outwardly toward the wall of the heat exchanger and the tubes will be spaced between 1/8" and 1/4" from each other. With such a construction, it will be apparent that it would be practically impossible to measure vibration of a tube of the condenser by applying a vibration indicator to the exterior of a tube since the spacing between the tubes would be insufficient to accommodate even a miniature accelerometer without interference from the outer surfaces of adjacent tubes or the fluid within the condenser and surrounding the tubes.

The lower tube T, as shown in FIG. 1, is provided with an accelerometer unit indicated generally at 25 and diagrammatically shown. The structure of the accelerometer unit will be described in more detail in connection with FIGS. 2 and 3 of the drawing. The accelerometer unit 25 is arranged to be moved between the open ends of a tube and for this purpose one cable 26 is secured to the accelerometer unit and has a portion extending through the end 27 of the tube T, while a second cable 28 is secured to the accelerometer unit and has a portion extending through the other end 29 of the tube. In order to manipulate the accelerometer or move it within the tube, a sealed opening 30 is provided in the end wall 14 through which the end portion of the cable 26 extends and a sealed opening 31 is provided in the end wall 16 through which the end portion of the cable 28 extends. Both of the cables 26 and 28 will be formed of conducting material for the purpose of transmitting signals from the accelerometer unit 25 to analyzer and recording instruments 32 and 32a.

Figure 2:
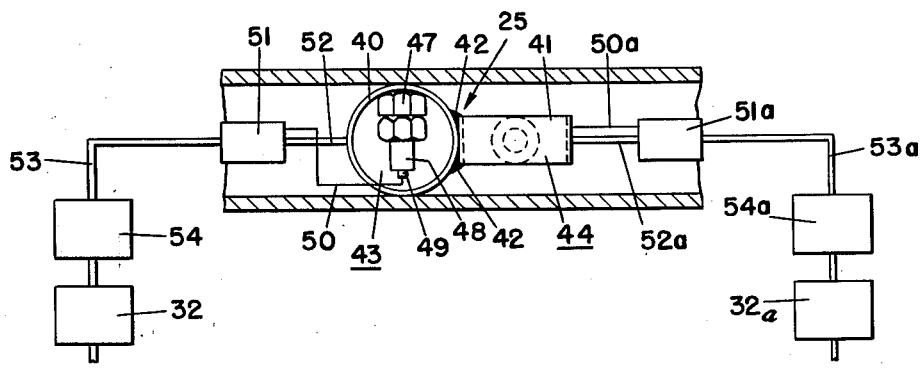
FIG. 2 is an enlarged view of a portion of FIG. 1 to show details.

Referring to FIG. 2, the accelerometer unit 25 is made up of a pair of rings 40 and 41 which are disposed in tandem 90° apart and soldered together as a unit, for example, by a silver solder connection 42. The ring 40 receives a miniature accelerometer 43 while the ring 41 receives a miniature accelerometer 44. The accelerometers are similar in design and are available on the market, but for the purpose of this invention are modified to adapt them to the intended use.

Figure 3:
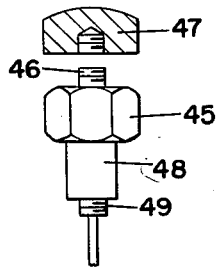
FIG. 3 is an exploded view showing a detail of FIG. 2.

Referring to FIG. 3, each of the accelerometers of the unit is made up of a housing indicated at 45 which is hollow to provide a compartment (not shown) for receiving a crystal element. The housing 45 has an integrally formed screw-threaded connecting end portion 46 by which it is removably attached to a nut 47 which in turn is secured to one of the rings 40 or 41. The nut 47 is, as shown in FIG. 2, arranged to abut the inner wall of ring 40 to which the nut is soldered, thus providing an arrangement whereby the housing 45 and associated structure may be removed for replacement. The crystal material is maintained within the housing 45 by means of a detachable bushing 48 which may, for example, be screw-threadedly mounted in the compartment of the housing 45 and, in turn, receives a removable tubular screw-threaded connecting shaft 49. The bushing 48 and shaft 49 provide an arrangement for receiving a conductor cable, such as cable 50 of FIG. 1, and maintaining it in conducting relation with the crystal within the housing 45. The screw-threaded end of shaft 49 may be provided with a cap (not shown) to seal its end.

Referring again to FIG. 2, the accelerometers 43 and 44 are provided with conductors 50 and 50a, respectively, which are made of extremely fine high signal loss wire or cable in order to be accommodated in the accelerometer structure and these conductors consequently have low physical strength. In order to provide strength to the assembly so that it may be moved through the tube T, connectors 51 and 51a, called cathode follower probes in this art, are connected respectively with the rings 40 and 41 by links 52 and 52a. The conductors 50 and 50a are necessarily of short length in order that the signal will not be completely lost and the cathode follower probes 51 and 51a function as elements to receive respectively low loss cables indicated at 53 and 53a which are of substantial physical strength to permit the accelerometer unit 25 and associated structure to be manipulated relative to the tube T. Cathode followers 54 and 54a are interposed between the cathode follower probes 51 and 51a and the analyzers and recorders shown at 32 and 32a to provide for proper impedance matching.

In using the accelerometer unit of this invention, the cathode follower probes 51 and 51a and the structure therebetween will be maintained within a tube while the vibration of the tube is being measured. The ends 27 and 29 of the tube will be fixed to the respective tube walls and will consequently be subjected to very little or no vibration and only the portion of the tube between its fixed end areas will need to be measured. Due to the arrangement of the accelerometers 43 and 44 and of the rings 40 and 41 in planes at 90° apart, the resultant of the vibration measurement recorded at 32 and 32a will give an accurate indication of the actual vibration taking effect within each tube. Although only one sealed opening is shown in each of the end walls of the heat exchange unit, in actual use other openings will be provided as required in order to measure other tubes. The accelerometer device will be constructed for ready assembly and disassembly, for example, the cathode follower probes and the equipment therebetween can be separated from the low loss conductors 50 and 50a for removal from one tube and replacement in another tube.

Since certain changes may be made in the above described construction and different embodiments of the invention may be made without departing from the scope thereof, it is intended that all matter contained in the above description or shown in the accompanying drawing shall be interpreted as illustrative and not in a limiting sense.

What is claimed is:

1. Apparatus for measuring tube vibration which comprises a unit formed of a pair of generally similar cylindrically shaped elements arranged within a tube in tandem and with their longitudinal axes normal to each other, each element having an outer surface in contact with the inner wall of the tube and a vibration pick-up device supported therein perpendicular to both the axis of the element and to the axis of the tube, each of the pick-up devices developing an electrical output as vibrations are transmitted thereto, a first conductor connected to one pick-up device permitting the unit to be moved through the tube in one direction, a second conductor connected to the other pick-up device permitting the unit to be moved through the tube in the other direction and vibration recording means connected to each of said conductors.

2. Apparatus for measuring tube vibration which comprises a unit formed of a pair of generally similar cylindrically shaped elements arranged within a tube in tandem with their longitudinal axes normal to each other and their outer peripheral walls secured together, each element having its outer peripheral wall in contact with the inner wall of the tube and a vibration pick-up device secured to the inner wall of the element perpendicular to both the axis of the element and to the axis of the tube, each of the pick-up devices being capable of developing an electrical output as vibrations are transmitted thereto, a first conductor connected to one pick-up device permitting the unit to be moved through the tube in one direction, a second conductor connected to the other pick-up device permitting the unit to be moved through the tube in the other direction and vibration recording means connected to each of said conductors.

3. Apparatus for measuring tube vibration which comprises a unit formed of a pair of generally similar cylindrically shaped elements arranged within a tube in tandem with their longitudinal axes normal to each other, each element having an outer surface in contact with the inner wall of the tube and a vibration pick-up device supported within the element and perpendicular to both the axis of the element and to the axis of the tube, each of the pick-up devices developing an electrical output as vibrations are transmitted thereto and conductor means connected to the pick-up devices permitting the unit to be moved through the tube in one direction and alternately in the other direction and vibration recording means connected to the conductor means.

References Cited in the file of this patent

UNITED STATES PATENTS

| | | |
|---|---|---|
| 2,604,181 | Basham et al. | July 22, 1952 |
| 2,982,942 | White | May 2, 1961 |